March 26, 1946. L. C. BROECKER 2,397,334
INSERT FOR VALVE STEMS OR THE LIKE
Original Filed Jan. 20, 1942
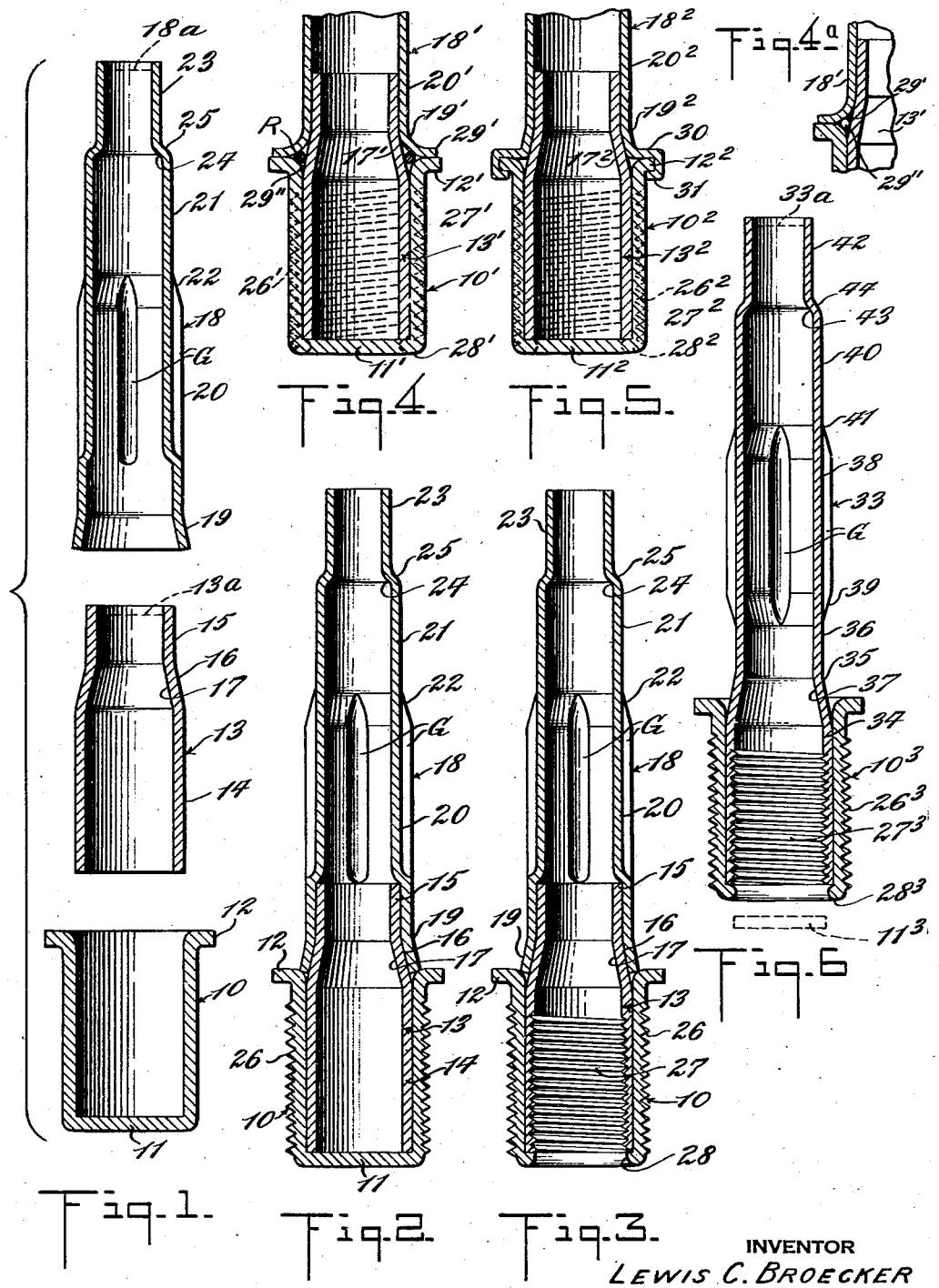
INVENTOR
LEWIS C. BROECKER
BY
ATTORNEYS Patented Mar. 26, 1946

2,397,334

UNITED STATES PATENT OFFICE 2,397,334

INSERT FOR VALVE STEMS OR THE LIKE

Lewis C. Broecker, Nichols, Conn., assignor to Bridgeport Brass Company, Bridgeport, Conn., a corporation of Connecticut Original application January 20, 1942, Serial No. 427,402, now Patent No. 2,346,413, dated April 11, 1944. Divided and this application April 9, 1943, Serial No. 482,387

10 Claims. (Cl. 152—430)

This invention relates to inserts for rubber valve stems or the like and to a method of manufacture of such inserts, and is a division of my co-pending application Ser. No. 427,402, filed January 20, 1942, now U. S. Patent No. 2,346,413, granted April 11, 1944.

An object of the invention is to manufacture such inserts from sheet metal instead of from solid bar as is the universal practice now. One of the advantages of utilizing sheet metal and the new process of manufacture is that steel as well as brass can be used advantageously inasmuch as machining or cutting operations are reduced to a minimum and scrap loss is very small.

Other objects, novel features and advantages of this invention will become apparent from the following specification and accompanying drawing, wherein:

Fig. 1 is a vertical longitudinal section showing the component parts of one form of construction;

Fig. 2 shows in similar section the component parts of the insert in assembled form;

Fig. 3 shows in similar section the completed insert made with the said parts;

Fig. 4 shows in similar fragmentary section a first modification in which one of the component parts has somewhat changed form;

Fig. 4a is a fragmentary section of the modification of Fig. 4 after heat has been applied to fuse the metal which joins the parts together;

Fig. 5 shows in similar fragmentary section a second modification in which the same component part has been further changed; and Fig. 6 shows in vertical longitudinal section a third modified form requiring only two component parts.

Referring first to Figs. 1 and 2, 10 denotes a cup-like or tubular member drawn from sheet steel or other suitable sheet metal. This member has an end closure 11 and an annular laterally extending flange 12 at its opposite open end. 13 denotes a second cup-like or tubular member drawn from the same material as cup-like member 10. The end closure 13a has been removed immediately after drawing. This tubular member has a portion 14 so admeasured as to interfit with the cup-like member 10, and a second portion 15 of reduced diameter joined to the portion 14 by a tapered portion 16 whose internal surface forms a valve seat 17.

A third drawn cup-like or tubular member 18 of the same material as member 10 is provided. The end closure 18a of this member is also removed directly after drawing. This third member 18 has a flared portion 19 shaped complementally to the outer surface of the tapered portion 16. A cylindrical portion 20 of reduced diameter is contiguous with the flared portion 19. This cylindrical portion 20 has an internal diameter substantially equal to the external diameter of the portion 15 of member 13 so that the tapered portion 16 and cylindrical portion 15 of member 13 may interfit respectively with the cylindrical portion 20 and the flared portion 19 of the third member 18.

A tubular cylindrical portion 21 of reduced diameter is joined to the portion 20 by a tapered portion 22. A third cylindrical portion 23 of still smaller diameter than portion 21 is provided contiguous with the latter with both an internal shoulder 24 and an external shoulder 25 at the junction of said two portions 21 and 23. All portions 19, 20, 22, 21 and 23 are, preferably, integral and adapted to engage with a rubber valve stem or the like.

The three members 10, 13 and 18 can all be drawn quickly and easily from sheet metal such as steel or brass. The end closures 13a and 18a of members 13 and 18 are removed after the drawing and prior to assembly. The end closure 11 is allowed to remain on the member 10 during the assembly operations for reasons which will hereinafter appear.

These three members are coated with a fusible metal. If of steel, they are each plated with a thin coating of copper. If of brass or other metal with a relatively low melting point, a coating of tin, zinc or lead is applied to each. The coatings are applied before the members are assembled, and have lower melting points than that of said members.

The coated members 10, 13 and 18 are assembled and interfitted as shown in Fig. 2 with the portion 14 of member 13 lying within member 10 and the portions 15 and 16 of member 13 interfitting with the respective portions 20 and 19 of member 18. After assembly the three parts are heated sufficiently to melt the coatings, preferably in a furnace with a neutral or controlled atmosphere. This causes the coatings on surfaces in contact to fuse together and the parts to be welded together securely.

Thereafter cap threads 26 are formed in the external surface of cup-member 10 either by rolling or in any other suitable way. During such application of the threads 26, the flange 12 and end closure 11 as well as the portion 14 of member 13 within said member 10 tend to keep the latter from collapsing. The threads 26 serve to receive a valve dust cap (not shown) or the like.

Thereafter the end closure 11 is pierced or drilled out or otherwise removed as shown in Fig. 3 and the member 13 provided with an internal thread 27 in its portion 14 either by tapping or in any other suitable way. The edges 28 of member 10 may then be suitably rounded. The internal threads serve to receive a valve inside of conventional or other suitable form.

The assembled insert is then ready for attachment thereto or engagement therewith of a rubber valve stem or the like (not shown) on portions of the member 18.

In the modification of Fig. 4, the members 10' and 13' are the same as members 10 and 13 of the construction of Figs. 1 to 3. Member 18' is structurally substantially identical with member 18 except that there an additional horizontal flange 29 is provided contiguous with the flared portion 19', the joint being rounded at 29' and defining with the rounded inner edge of the flange 12 an annular space 29'' when the members 10', 13' and 18' are assembled in the same way as the parts 10, 13 and 18. Prior to the mounting of part 18' on part 13' an annular ring or band R is fitted on member 13'. When the parts are assembled this lies in the annular space 29''. When the part 18' is mounted on part 20' of member 13' the flange 29' is forced into abutment with flange 12' of member 10'. If the parts are of steel the ring R is preferably of copper. If the parts are of brass, the ring R is preferably of silver solder which has a suitable flux associated therewith. Thereafter the assembled parts are heated sufficiently to melt the ring R, the melted metal being drawn by capillarity into the joints between the various parts and securely fastening the parts together as shown in Fig. 4a. In such treatment the flanges also are metallically secured either by the copper or silver solder. When such rings R are used, it is unnecessary to apply coatings to the members 10', 13' and 18'. Also, if the parts are of steel and the ring or band R is of copper, no flux is required because of the affinity these two metals have for each other. On the other hand, if no rings R are used, each of these parts must be coated with the same material as parts 10, 13 and 18. In such event, heating of the assembled parts causes the coatings to melt and the parts to be welded together securely, the flanges also then being welded together by the coating metal.

Thereafter, the external surface of member 10' is threaded at 26', the end closure 11' pierced or otherwise removed and member 13 internally threaded at 27' as with the modification of Figs. 1-3 inclusive.

In the modification of Fig. 5, the members $10^2$ and $13^2$ are the same as in the previously described modifications. Member $18^2$ is structurally identical with member 18 except that an additional flange 30, larger than flange 29, is provided contiguous with the flared portion $19^2$. Members $10^2$, $13^2$ and $18^2$ are coated with the same coating as previously described or provided with a fusible metal ring R as described with respect to Fig. 4. The members $10^2$, $13^2$ and $18^2$ are assembled in the same way as parts 10, 13 and 18 after being coated or provided with the ring R. Then a portion 31 of the flange 30 is bent around and under the flange $12^2$ to mechanically secure the three members together. The so assembled parts are then heated as previously described to fuse the fusible ring R or coatings and weld the parts together as well. Thus the three parts $10^2$, $13^2$ and $18^2$ are locked together mechanically as well as by the welded surfaces. Thereafter the external surface of member $10^2$ is threaded at $26^2$, the end closure $11^2$ pierced or otherwise removed and member $13^2$ internally threaded at $27^2$ as with the modifications of Figs. 1-3 inclusive.

Figure 6 shows a further modification involving the use of only two separate parts instead of three. In this construction the cup-member $10^3$ is like that of the other modifications. Members 13 and 18, however, are replaced by a single cup-member 33 whose end closure 33a is removed after said member 33 has been drawn from suitable sheet metal and prior to assembly. Member 33 has a cylindrical portion 34 admeasured to interfit with the cup-member $10^3$. A tapered portion 35 joins portion 34 with a second cylindrical portion 36 of reduced diameter. Internally the tapered portion 35 provides a valve seat 37 similar to valve seat 17 of the first modification. A third cylindrical portion 38 of different diameter from that of portion 36 is joined by a tapered portion 39 to the second cylindrical portion 36. A fourth cylindrical portion 40 corresponding generally to the portion 21 of the first described modification is joined by a tapered portion 41 to the portion 40. A fifth cylindrical portion 42 of different diameter from that of portion 40 is provided contiguous with the latter with both an internal shoulder 43 and an external shoulder 44 defined at the junction of said two portions 40 and 42.

The member 33 can be drawn quickly from sheet metal of the same kind as previously mentioned. Its end closure 33a is pierced or removed after drawing and before use.

Before assembly, this member 33 is coated or plated at least on the outer surface of its portion 34 and, preferably, all over with the same type of coatings previously mentioned.

The coated members $10^3$ and 33 are assembled as shown in Fig. 6 with the portion 34 of member 33 fitting wholly within member $10^3$. Thereafter the assembled parts are heated as previously described to melt the coatings of surfaces in contact and to weld the parts together securely. Then the threads $26^3$ are rolled or otherwise formed on the outer surface of member $10^3$. The end closure of member $10^3$ is then drilled or pierced and the inner surface of portion 34 internally threaded at $27^3$ and the edge $28^3$ of member $10^3$ rounded. The completed insert is then ready for attachment to a rubber valve stem or the like to portions of the member 33.

The valve seats 17, 17', $17^2$ or 37 can be reamed or otherwise finished after the internal threading of members 13 or 38 has been effected should it be necessary.

Instead of being rolled in, the threads 26, 26', $26^2$ or $26^3$ may be applied to members 10, 10', $10^2$ or $10^3$ by cutting or milling. In such event the closed ends 11, 11', $11^2$ of the cup members 10, 10', $10^2$ or $10^3$ are punched out or otherwise removed during the manufacture of such cups.

Each of members 10, 18', $18^2$ and 33 may be provided with grooves G or projections (not shown) to permit holding or gripping of the assembled parts during threading of members 10, 10', $10^2$ or $10^3$.

While specific embodiments of process and product have been shown and described herein, it is to be understood that variations in process steps and in structural detail within the scope of the appended claims is contemplated. There is no intention of limitation to the exact details shown and described.

What is claimed is:

1. An insert for rubber valve stems or the like comprising, interfitting assembled tubular members of drawn sheet metal, said members being provided with surfaces coated with a fusible metal, and said members having some of their coated surfaces in contact, with the coatings on such surfaces welded together, one of said members having an externally threaded portion to receive a valve cap, another of said members having an internally threaded portion to receive a valve inside, and the assembled members having a portion adapted for engagement with a rubber valve stem or the like.

2. An insert for rubber valve stems or the like comprising, interfitting assembled tubular members of drawn sheet metal, said members being provided with surfaces coated with a fusible metal and having some of their coated surfaces in contact, with the coatings on such surfaces welded together, one of said members having an externally threaded portion, another of said members having a valve seat and an internally threaded portion, and the assembled members having a portion adapted for engagement with a rubber valve stem or the like.

3. An insert for a valve stem or the like comprising, tubular members of drawn sheet metal provided with surfaces coated with a metallic coating having a lower melting point than that of said members, a first of said members having an externally threaded portion, a second of said members having a portion interfitting with said first of said members and being internally threaded and having a second portion projecting outwardly of said first of said members, and a third of said members having a portion interfitting with said outwardly projecting portion of said second member and another portion adapted for engagement with a valve stem or the like, and the coatings of said interfitting portions being welded together.

4. An insert for rubber valve stems or the like comprising, interfitting assembled tubular members of drawn sheet metal, said members being welded together, one of said members having an externally threaded portion and a flange, another of said members having an internally threaded portion and a valve seat, and another of said members having a flange, said two flanges being interlocked, and said last-named member having a portion adapted for engagement with a rubber valve stem or the like.

5. An insert for a rubber valve stem or the like comprising, interfitting, assembled tubular members of drawn sheet metal provided with surfaces coated with a metallic coating having a lower melting point than that of said members, and said members having certain of their surfaces in contact, with the coatings on such surfaces welded together, one of said members having an externally threaded portion, a second of said members having a portion lying within said first one of said members and being internally threaded, said second of said members also having an internal valve seat and a portion projecting outwardly of said first one of said members, and a third of said members interfitting with said outwardly projecting portion of said second member and having a portion adapted for engagement with a rubber valve stem or the like.

6. An insert for a rubber valve stem or the like comprising interfitting tubular members of drawn sheet metal provided with surfaces coated with a metallic coating having a lower melting point than that of said members and said members having certain of their coated surfaces in contact with the coatings on such surfaces welded together, one of said members having an annular flange, a second of said members having an annular flange engaging said first-named flange and said flanges being welded together by metal having a lower melting point than that of said members, and said first-named of said members having an externally threaded portion, a third of said members having an internally threaded portion, an internal valve seat and a portion extending outwardly of said first-named of said members, and said second-named of said members interfitting with said outwardly extending portion of the third-named member and having a portion adapted for engagement with a rubber valve stem or the like.

7. An insert for a rubber valve stem or the like comprising interfitting tubular members of drawn sheet metal having interengaging surfaces welded together by a metal having a lower melting point than that of said members, one of said members having an annular flange, a second of said members having an annular flange engaging said first-named flange and said flanges also being welded together by metal having a lower melting point than that of said members, said first-named of said members having an externally threaded portion, a third of said members fitting within said first-named of said members and having an internally threaded portion, an internal valve seat and a portion extending outwardly of said first-named of said members and interfitting with said second-named of said members, and said second-named of said members having a portion adapted for engagement with a rubber valve stem or the like.

8. An insert for a rubber valve stem or the like comprising interfitting tubular members of drawn sheet metal having interengaging surfaces welded together by a metal having a lower melting point than that of said members, one of said members having an annular flange, a second of said members having an annular flange engaging and interlocked with said first-named flange and said flanges also being welded together by metal having a lower melting point than that of said members, said first-named of said members having an externally threaded portion, a third of said members fitting within said first-named of said members and having an internally threaded portion, an internal valve seat and a portion extending outwardly of said first-named of said members and interfitting with said second-named of said members, and said second-named of said members having a portion adapted for engagement with a rubber valve stem or the like.

9. An insert for valve stems or the like comprising, interfitting tubular members of drawn sheet metal having interengaging surfaces welded together, one of said members having an externally threaded portion, a second of said members interfitting with said first-named member and having an internally threaded portion and a valve seat and also having a portion extending outwardly of said first-named member, and a third member having a portion interfitting with said outwardly extending portion of said second-named member and being provided with a portion adapted for engagement with a valve stem or the like.

10. An insert for valve stems or the like comprising, interfitting tubular members of drawn sheet metal, having engaging surfaces welded together, one of said members having an externally threaded portion and a second of said members interfitting with said first-named member and having an internally threaded portion, a valve seat, and a portion extending outwardly of said first-named member, and means in conjunction with said outwardly extending portion adapted for engagement with a valve stem or the like.

LEWIS C. BROECKER.